United States Patent Office.

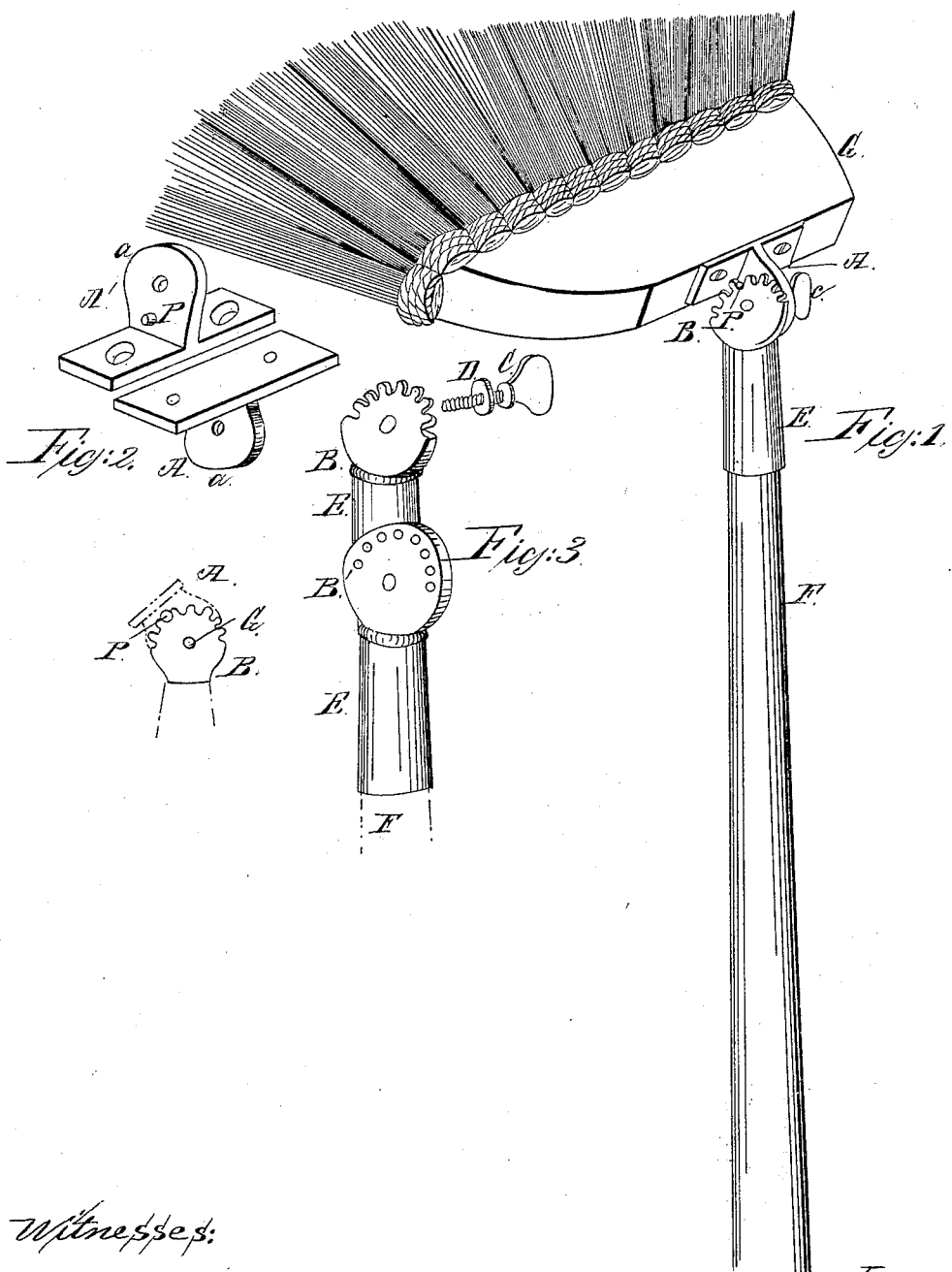

ANTHONY ISKE, OF LANCASTER, PENNSYLVANIA, ASSIGNOR TO HIMSELF AND CHARLES JOSEPH WALSER, OF SAME PLACE.

Letters Patent No. 69,097, dated September 24, 1867.

IMPROVED HOLDER FOR WHITEWASH BRUSHES.

The Schedule referred to in these Letters Patent and making part of the same.

TO ALL WHOM IT MAY CONCERN:

Be it known that I, ANTHONY ISKE, of Lancaster, in the county of Lancaster, and State of Pennsylvania, have invented a new and useful Combined Holder for Whitewash Brushes and the like, in order to adjust them to any desired position; and I do hereby declare that the following is a full, clear, and exact description of the construction and operation of the same, reference being had to the accompanying drawings, making a part of this specification, in which—

Figure 1 is a perspective view of the holder connecting the brush and handle.

Figure 2, the several parts shown detached.

The nature of my invention consists in providing a joined connection of two parts moving on each other on a central axis, one part connected with the brush, the other with the handle, in such a manner that the brush can be set at any desired angle, from horizontal to vertical, with ease, and applicable to any brush or length of handle, and that may be removed from a worn-out brush to a new one.

To enable others skilled in the business to make and use my invention, I will proceed to describe its construction and operation.

Fig. 2 illustrates my plate A, which is affixed by two screws to the end of the brush. This plate has a central vertical rounded flange, with a peg or pin, P, near the base. The portion for the handle has a socket, E, and disk, B, provided with cog-like teeth on the upper circular edge, or a series of holes may be made, as shown in B'. The space between the teeth or holes is made for the reception of the pin P on the counterpart A. The flange or disk a of A, of a size to match the disk or flange B, perforated in the centre for a thumb-screw, C, with its washer D, a female screw-thread being cut into the perforation in A.

The operation is such that when the screw is slackened so as to separate the disks A B in order to turn the brush, so that the peg will enter the desired notch or hole, the parts are drawn tightly together, and the parts will be as firm in the adjusted position as if held permanently by a rivet.

By means of this device any whitewash brush can be used, or so much of the wood, usually required for the handle, sawed off as will decrease the weight as much as or more than that of the socket and flat plates A B combined, and it affords a greater range of adjustment in the brush to the handle than when the end and side holes only can be used, as in the ordinary whitewash brush; besides, the handle is more firmly held in place, and the socket is equally well adapted for a long or short handle. The appliance is easily transferred from a worn-out brush to a new one. Other advantages are apparent; the ordinary eye of the brush frequently splits out by forcing in the handle, and the smaller eye on the end is not well adapted to hold the handle when used vertically.

I am aware that sockets have been employed, but not with a view to the adjustability of the brush.

What I claim as my invention, and desire to secure by Letters Patent, is—

The combination of the disk A provided with stationary pin P, the notched or perforated disk B and the tightening-screw C, when constructed, applied, and operating substantially as described.

ANTHONY ISKE.

Witnesses:
   CHAS. R. FRAILEY.
   JACOB STAUFFER.